Sept. 6, 1955     H. S. BALDWIN     2,717,019
TRACTION DEVICE FOR VEHICLE WHEELS
Filed Nov. 13, 1953
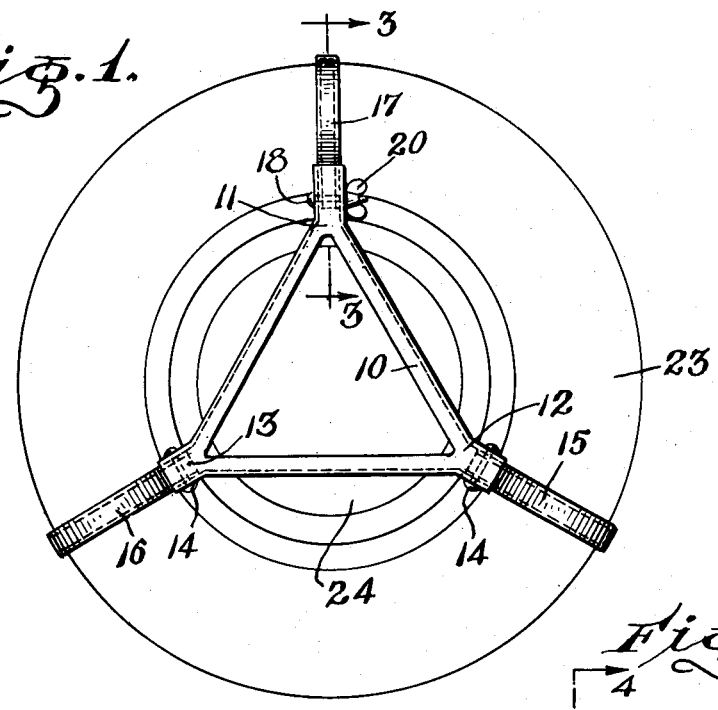
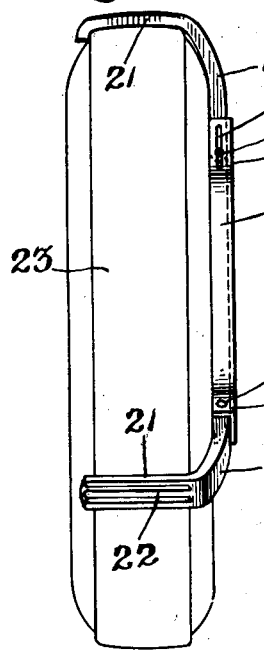
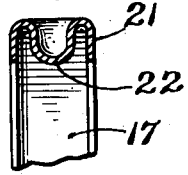
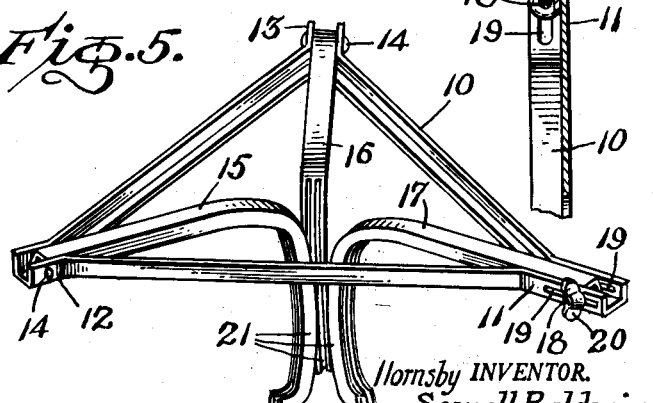
Hornsby INVENTOR.
Sewell Baldwin,
BY
L. S. Saulsbury
ATTORNEY.

United States Patent Office 2,717,019
Patented Sept. 6, 1955

2,717,019
TRACTION DEVICE FOR VEHICLE WHEELS
Hornsby Sewell Baldwin, Perth Amboy, N. J.

Application November 13, 1953, Serial No. 391,896

3 Claims. (Cl. 152—226)

The present invention relates to a traction device for vehicle wheels and it consists in the combinations, constructions and arrangements of parts herein described and claimed.

Generally there is provided a traction device for vehicle wheels which is collapsible in nature so that it may be transported in a minimum of space and which, when needed, may be extended quickly and easily to encompass an automobile wheel to provide greater traction therefor. The device consists essentially of a frame in the form of an isoceles triangle to the apex portions of which frame are pivotally connected arms each having a curved portion adapted to encompass the tread of an automobile tire in assembled condition upon an automobile wheel. One of the arms is adjustable so that the device may be quickly and easily fitted to wheels of different sizes.

It is accordingly an object of the invention to provide a device of the character set forth which is simple in construction, inexpensive to manufacture and yet effective and efficient in use.

Another object of the invention is to provide a device of the character set forth which is capable of being collapsed to occupy a minimum of space when in storage.

Another object of the invention is to provide, in a device of the character set forth, a novel adjustable arm forming a part of the invention.

Other and further objects of the invention will become apparent from the reading of the following specification taken in conjunction with the drawing in which:

Figure 1 is a side elevational view of an embodiment of the invention, showing the same in mounted position upon an automobile wheel, Figure 2 is an end elevational view of Figure 1, Figure 3 is an enlarged fragmentary sectional view taken substantially along line 3—3 of Figure 1, Figure 4 is a further enlarged fragmentary sectional view taken along line 4—4 of Figure 3, and Figure 5 is a perspective view of the device illustrated in Figures 1 to 4, inclusive, showing the same in collapsed condition.

Referring more particularly to the drawing, there is shown therein a device of the character set forth comprising a frame 10 of isoceles triangular shape and provided, of course, with three apex portions 11, 12 and 13. The frame 10 is made of angle irons which are joined to form apex portions 11, 12 and 13 of U-shaped cross sectional area.

Pivotally mounted by means of pins 14 in each of the apex portions 12 and 13 is an arm 15 and 16, respectively. A like arm 17 is pivotally mounted upon a bolt 18 which extends through slots 19 formed in the leg portions of the apex portion 11, a wing nut 20 being provided for the bolt 18.

Each of the arms 15, 16 and 17 is preferably formed of U-shaped cross sectional area and each is provided at its outer end with an integrally formed hook-like shoe 21 which may be corrugated, as indicated at 22, to provide better gripping surface. Of course, any suitable surface configuration may be provided for this purpose upon the outer face of the shoes 21.

In operation, it will be apparent that when it is desired to provide additional traction for, for example, a tire 23 of an automobile wheel 24, it is only necessary to extend the arms 15, 16 and 17 in such manner as to encompass the tire 23 so that the inner faces of the shoes 21 will lie upon the tread portion of the tire 23. Thereafter, it is only necessary to move the arm 17 inwardly to the fullest extent possible, which action will, of course, cause the shoes attached to the arms 15 and 16 to likewise move inwardly with respect to the tire 23 after which the wing nut 20 is tightened upon the bolt 18 thereby securely locking the device upon the tire 23. To remove the device when it is no longer necessary, it is only necessary to reverse the above-described action.

While but one form of the invention has been shown and described herein, it will be readily apparent to those skilled in the art that many minor modifications may be made without departing from the spirit of the invention or the scope of the appended claims.

What is claimed is:

1. A collapsible traction device for attachment to vehicle wheels comprising a rigid frame of isoceles triangular shape, the frame encompassing an opening sufficiently large for the purpose hereafter described, an arm pivotally mounted at each apex portion of the frame for movement transverse to the plane of the frame, a tire-engaging hook formed integrally with the outer end of each arm, the pivot of one of said arms being mounted for lateral movement with respect to said frame to regulate the effective length of said arm, and means for fastening the said latter pivot in place upon the frame, the tire-engaging hook portions passing through the opening of the frame when the device is in collapsed condition.

2. The apparatus of claim 1 in which the frame is provided with radial extensions at each apex, the pivots of the arms being mounted in the extensions, one of the extensions having slots in which the said pivot of one of said arms is mounted for said lateral movement.

3. A traction device for attachment to vehicle wheels comprising a rigid frame of isoceles triangular shape, an arm pivotally mounted at each apex portion of the frame for movement in a plane transverse to the plane of the frame, a tire-engaging hook formed integrally with the outer end of each arm, one of said apex portions being provided with opposite slots extending radially of the frame, the pivot of one of said arms being carried in said slots whereby the effective length of said arm can be regulated, and means for fastening the said latter pivot in place.

References Cited in the file of this patent

UNITED STATES PATENTS

| 1,769,307 | Price | July 1, 1930 |
| 1,882,376 | Weber | Oct. 11, 1932 |
| 2,477,051 | Eisenhauer | Juy 26, 1949 |